Aug. 3, 1943.　　　　P. JEPSON　　　　2,325,862
MULTIPLE LOADING TRACK OR CONVEYER FOR FRUITS OR VEGETABLES
Filed April 7, 1941　　　4 Sheets-Sheet 1

INVENTOR
Percy Jepson
BY Boykin & Mohle
ATTORNEYS

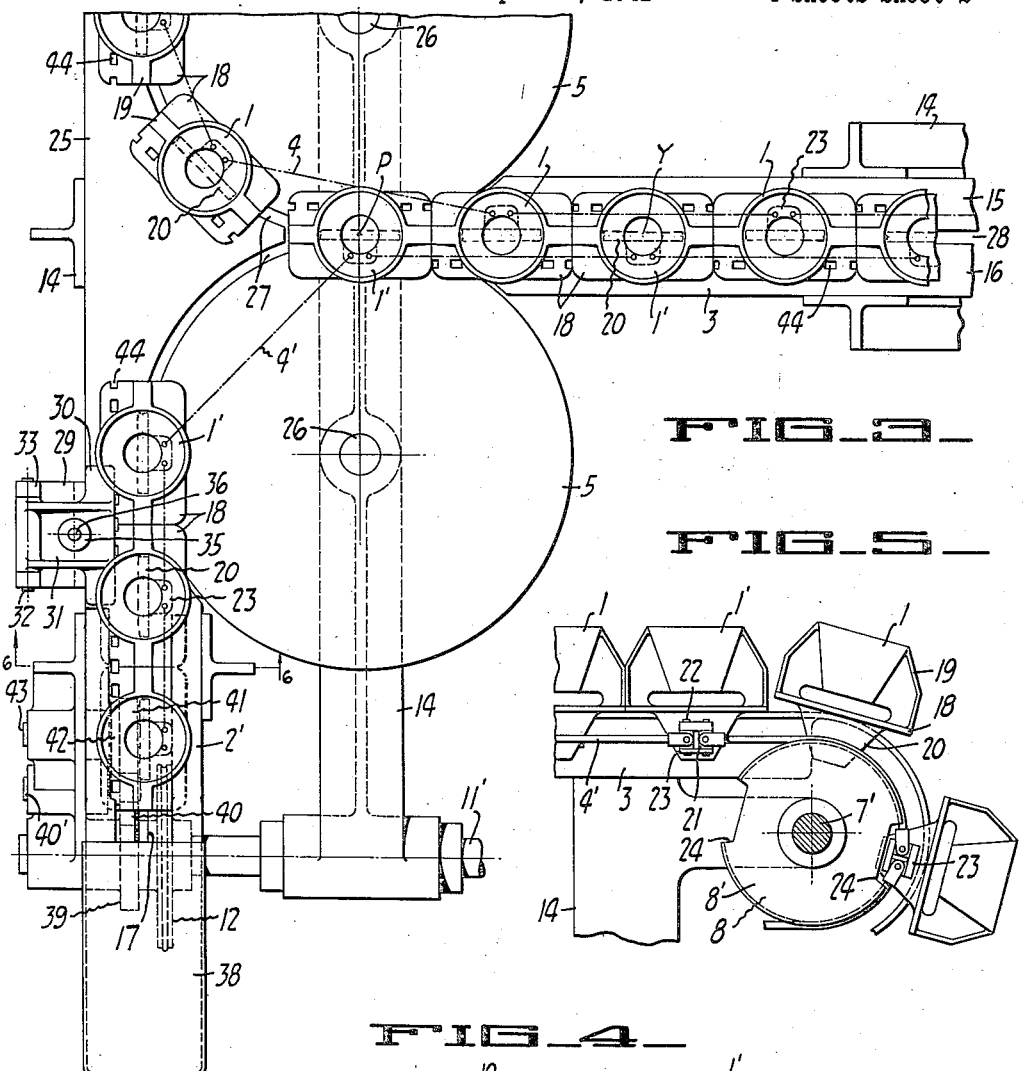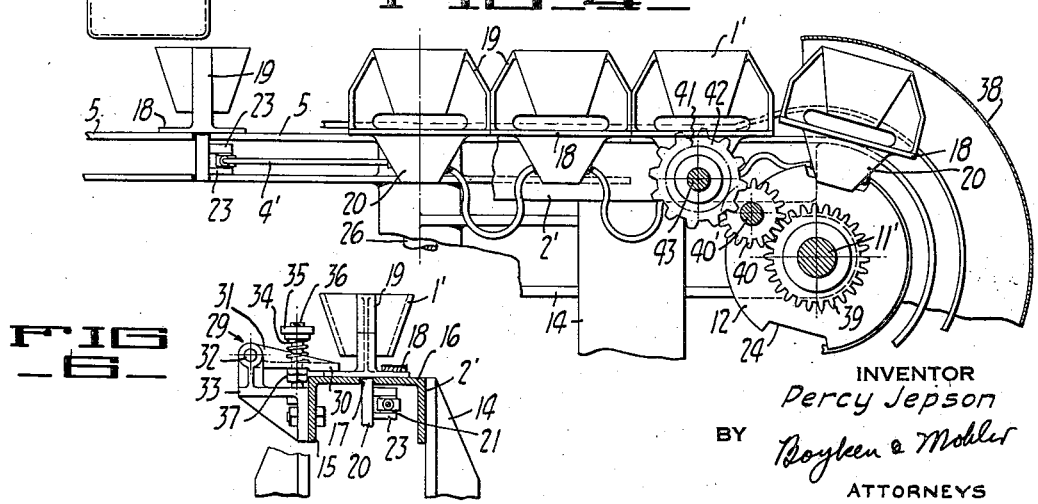

Aug. 3, 1943.  P. JEPSON  2,325,862
MULTIPLE LOADING TRACK OR CONVEYER FOR FRUITS OR VEGETABLES
Filed April 7, 1941  4 Sheets-Sheet 3
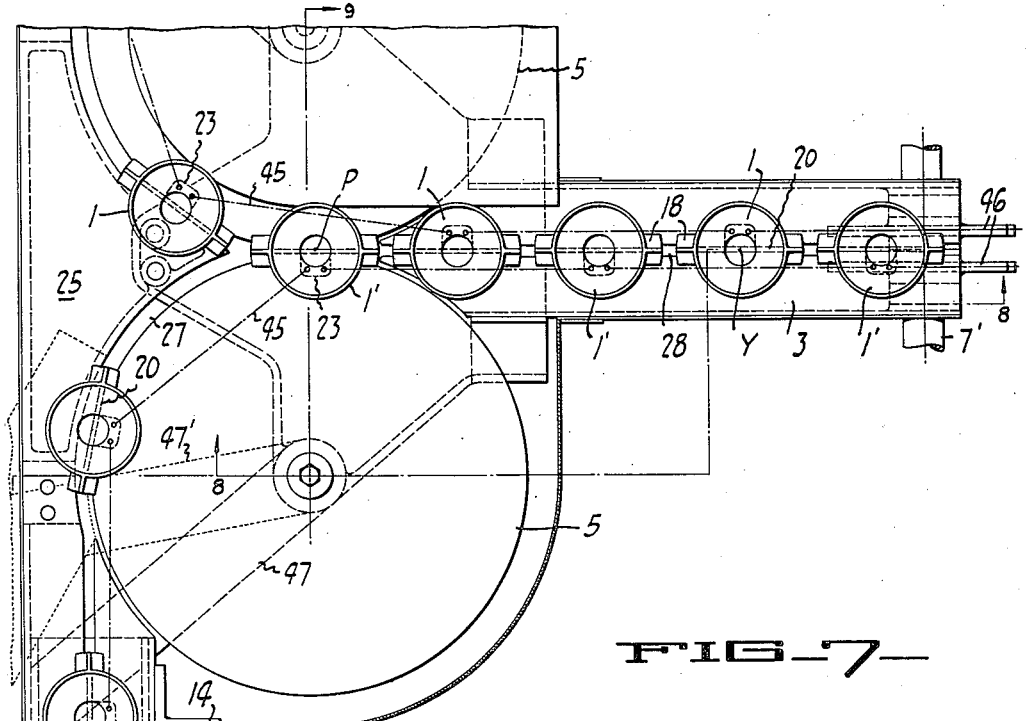
FIG-7-
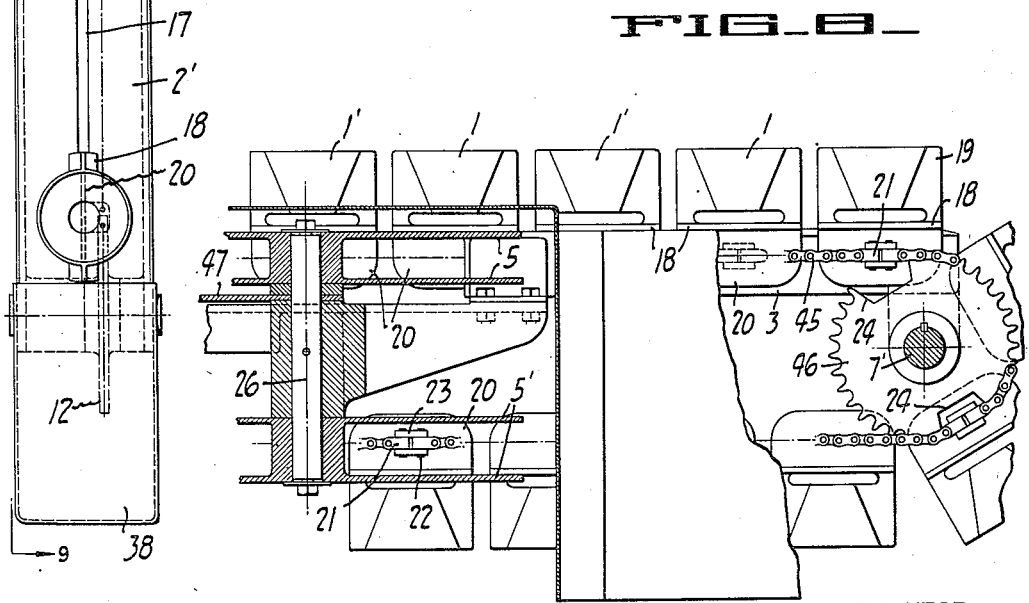
FIG-8-
INVENTOR
Percy Jepson
BY Boyken & Mohler
ATTORNEYS Aug. 3, 1943.   P. JEPSON   2,325,862
MULTIPLE LOADING TRACK OR CONVEYER FOR FRUITS OR VEGETABLES
Filed April 7, 1941   4 Sheets-Sheet 4
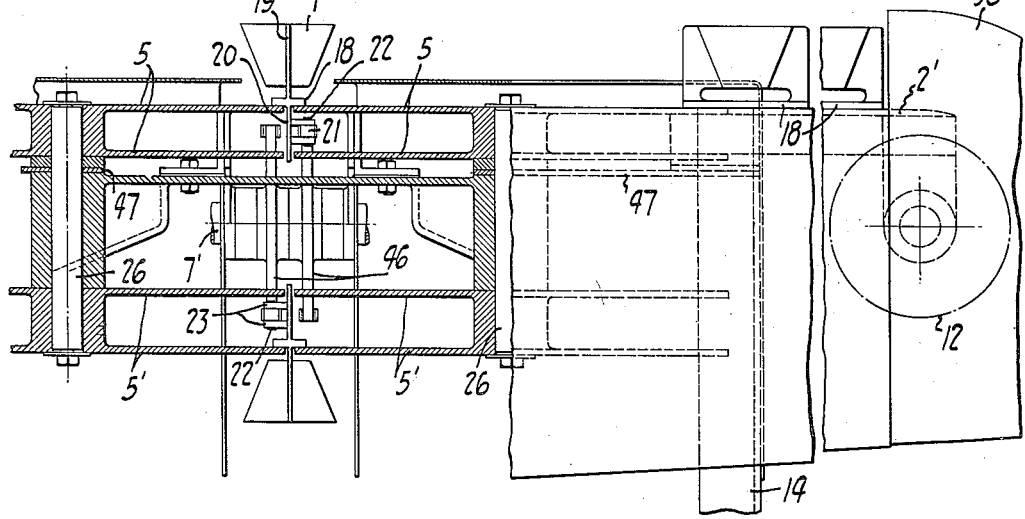
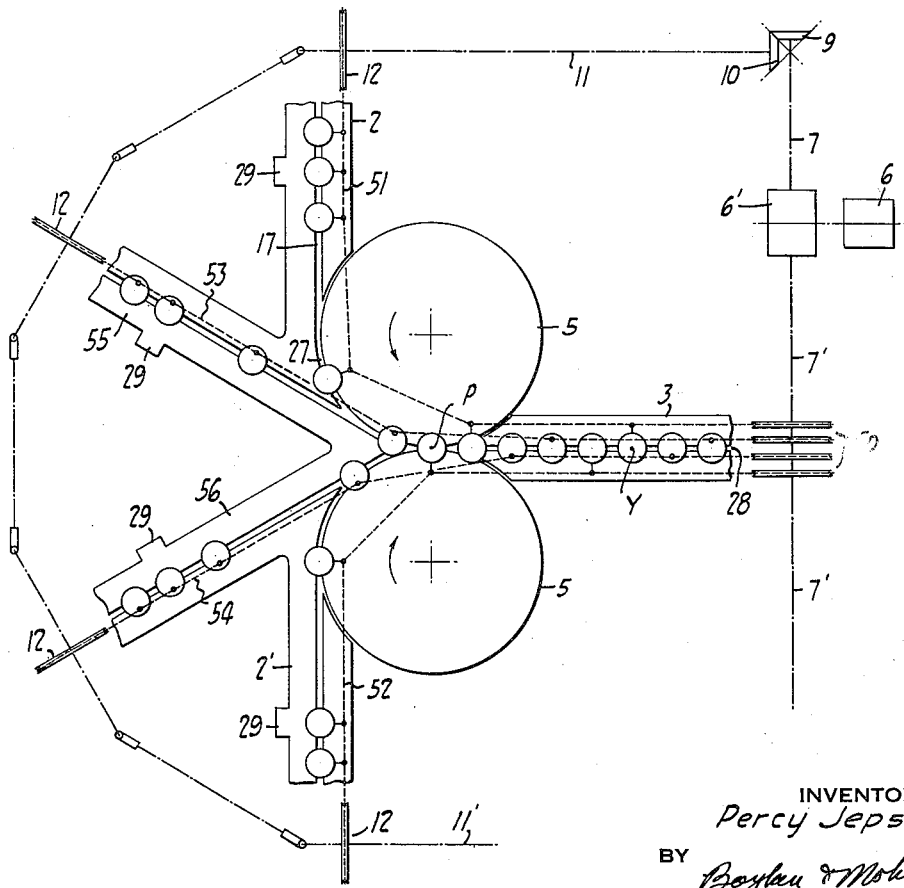
INVENTOR
*Percy Jepson*
BY
*Boylan & Mohler*
ATTORNEYS Patented Aug. 3, 1943

2,325,862

UNITED STATES PATENT OFFICE 2,325,862

MULTIPLE LOADING TRACK OR CONVEYER FOR FRUIT OR VEGETABLES

Percy Jepson, Oakland, Calif.

Application April 7, 1941, Serial No. 387,137

6 Claims. (Cl. 198—75)

This invention relates to feed devices generally, and more specifically, to a multiple loading track, or conveyer, for fruit and vegetables, or the like, and method of handling such articles or products.

An object is improved method for increasing the capacity of a single fruit or vegetable treating machine such as a corer, trimmer, parer, slicer, etc., or a transfer device, in which the fruit or vegetable units to be treated or transferred by such machine or device, must be successively delivered thereto in a manually, previously arranged, predetermined position that is accomplished by individual operators.

A still further object is an improved feed or loading device, in which there are a plurality of endless conveyers respectively arranged and adapted to be manually loaded with individual fruit units thereon in single file or row at loading stations therealong, and which conveyers are adapted to carry such units longitudinally of the rows of fruit so loaded thereon along separate paths of travel to a single point where the units from each file or row are carried by the same conveyers in a single row along a single path of travel for treatment at a predetermined point along such single path of travel.

Another object of the invention is an improved feed or loading device in which a plurality of conveyers are arranged and adapted to carry individual bodies of fruit in uniform spaced relation along converging paths of travel to a common point for alternate arrival at said point from different of said paths, and which conveyers continue past said point in such arrangement relative to each other that they carry the fruit bodies away from said point in uniform spaced relation in a single path of travel, without displacement or shifting of the fruit bodies relative to the conveyers that support the same, and which conveyers are actuated for carrying the fruit bodies along a portion of each of said converging paths at a slower rate of speed than along said single path and without stoppage of movement of the said bodies while they are being carried along said converging paths and said single path.

A still further object of this invention is the provision of supports for respectively supporting individual fruit units, or the like, in uniform spaced relation in converging rows and means for simultaneously moving said supports in all of said rows in direction longitudinally of said rows to a common point for arrival at said point successively in uniform spaced relation and without change in the position of each unit relative to its support, and each of which supports is adapted to be manually loaded with a fruit unit in a predetermined position relative thereto for movement therewith to said point.

Other objects and advantages will appear in the specification and drawings.

In the drawings, Fig. 1 is a diagrammatic plan view of one form of the invention and Fig. 2 is a diagrammatic side view.

Fig. 3 is a plan view of the form of my invention, shown in Figs. 1, 2, partially broken away at one side, since the machine is symmetrical.

Fig. 4 is a front elevational view of the portion of the device shown in Fig. 3, in which the brake element is omitted for clarity.

Fig. 5 is a side elevational view of the device of Fig. 3, partly broken in length and partly in section.

Fig. 6 is a sectional view taken along line 6—6 of Fig. 3, showing the brake element omitted from Fig. 4, in elevation.

Fig. 7 is a plan view of another form of the invention, a portion of the device being broken off at one side, since the device illustrated in this view is also symmetrical in plan view.

Fig. 8 is a part sectional and part elevational side view of the device of Fig. 7.

Fig. 9 is a part sectional and part elevational front view of a portion of the device of Fig. 7.

Fig. 10 is a diagrammatic plan view of a device having four separate conveyers.

Briefly described, in fruit processing machines, such as peeling, or coring, or other fruit and vegetable treating machines where the fruit or vegetables must be positioned correctly on loading track, conveyer, or the like, the amount or number of units or pieces treated by a machine has been limited to the speed of the operator in correctly loading the same on a single track or conveyer.

Briefly stated, fruit loading devices are old in fruit treating or transfer devices, an early example of which is shown in the early United States Letters Patent to Ish, 436,629, September 16, 1890. In coring, paring, and other fruit treating machines, the fruit units, such as pears, apples, etc., must be singly fed or delivered to the cutting or coring element of such machine in a particular position, and this means that the fruit or vegetable units must each be manually positioned on a feed device that carries the fruit to the element or elements that work on the units. The machine that performs the desired operation on the fruit units has heretofore been slowed down, as it were, to operate only as fast as the operator can properly load the units on the loading track or conveyor means that carries the fruit to the desired point, either for direct operation on the fruit at said point, or for transfer from said point in the correct position to the fruit treating element or elements. The fruit treating machines are, as a rule, very expensive, and have a fruit treating capacity much greater than the loading capacity of the operator, hence, to treat a large volume of fruit or vegetable units, the packers, canners, or the like have heretofore been compelled to install greater numbers of fruit treating machines. Any attempt to speed up the feed devices is unpractical, and dangerous, since the speed of travel of the fruit or vegetable supporting elements past the loading station, if too fast, results in faulty work on the part of the operator, and danger to his or her fingers, to say nothing of the ill effects on the nerves of such operator.

In my invention, the maximum delivery capacity of a transfer device, or the maximum capacity of a fruit treating machine, is obtained with no detrimental strain on the operators that position the fruit or vegetable units that are subsequently transferred or treated.

Figure 1:
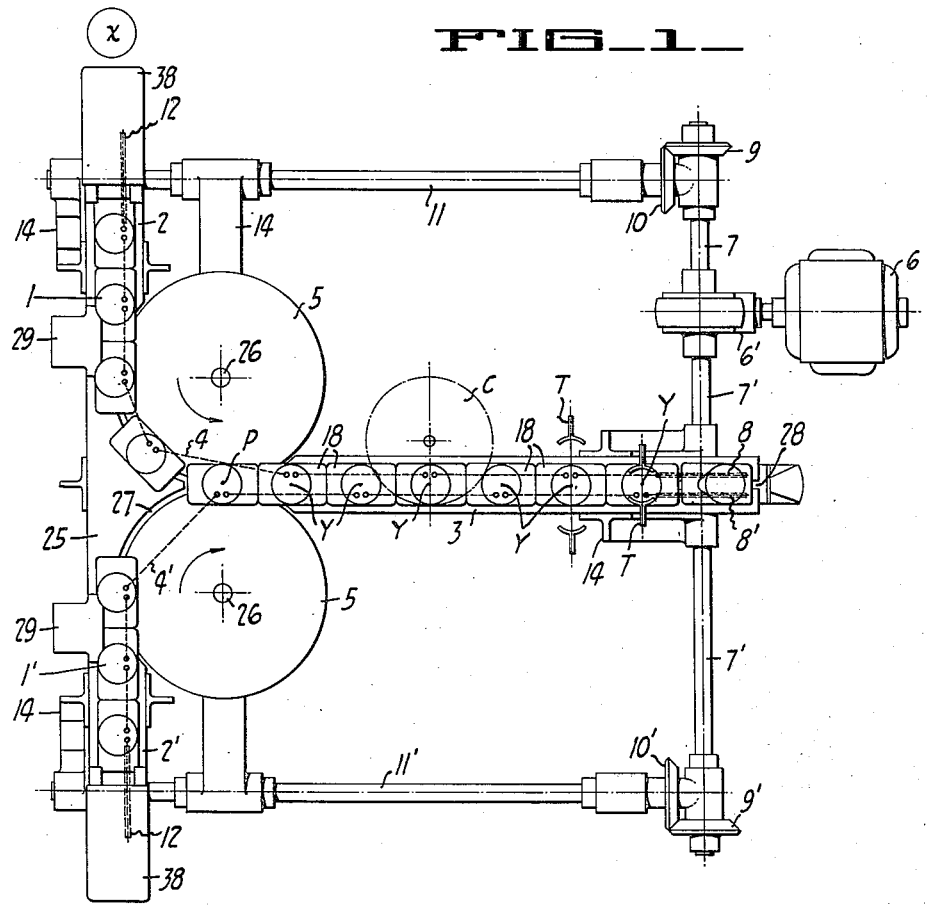
Figure 2:
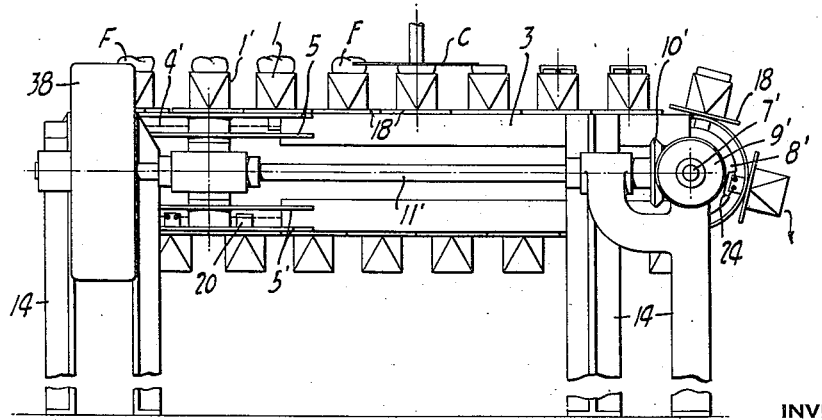

Referring to Fig. 1, I show a double conveyer system, in which the positions of the operators that load fruit or vegetable units on the conveyers are indicated at X. The fruit or vegetable supporting members of one conveyer are designated 1, and those of the other conveyer are designated 1', which members, respectively are carried in rows on tracks 2, 2' for movement of the members of each row, longitudinally thereof, in separate paths of travel to a point where the members of the several rows are carried in alternating relation in a single row on track 3 to any one or more of transfer, delivery or treating points Y. For example, a cutter C may be positioned along track 3 and across the single path of travel of the fruit F supported on members 1, 1' to remove an end from the fruit as each fruit unit F moves past cutter C, or transfer members T of any suitable transfer mechanism may operate at a point Y to engage the fruit units F and remove the latter from the members 1, 1' for subsequent treatment of the fruit by another machine.

While the supporting members 1, 1' are shown as cups, adapted to support pears therein with their blossom ends up and stem ends down, it is obvious that these members may have other forms, according to the position in which the fruit or vegetables are to be supported, and according to the shape or character of the fruit or vegetables, or the character of the operation to be performed on the fruit or vegetables. Thus, channels, impaling blades or points, etc., all of which have been employed heretofore in one form or the other for carrying fruit or vegetables, may be used, and the transfer, delivery, or fruit treating point may be at point P or at any of the points Y, since all of these points are common to the fruit or vegetable units from the several tracks, such as 2, 2'.

In the forms of the invention, herein illustrated, the fruit supporting members 1 are secured together in an endless row, by equal length flexible sections 4, such as of wire, cable, chain, and members 1' are likewise in an endless row secured together by similar sections 4'. The rows of members 1, 1' are driven longitudinally of said rows to carry said members around coplanar disks 5 to between adjacent edges of said disks, and said members 1, 1' are arranged in their respective rows in a manner to move from tracks 2, 2' to alternating relation on track 3 at point P, which point is between said adjacent edges of disks 5. The flexible cables, chains, or the like that connect between member 1, 1' of the separate rows thereof, are offset to one side of the central lines of each row, to prevent interference between the flexible sections 4, 4' along track 3.

The loading points or stations along tracks 2, 2' are adjacent the points X, and an operator at each of said latter points positions the fruit or vegetable units on members 1, or 1' as the said members arrive at said stations on their way to point P, and from point P the said members move in a single file on track 3 past points Y. The lengths of the sections 4, or 4' between adjacent pairs of members is sufficient to enable each member 1 on track 3 to alternate with a member 1', thus, if the speed of travel of the separate rows of members 1, 1' on tracks 2, 2' is the same as the speed of travel of members 1, 1' on track 3, it is manifest that at least double the number of fruit supporting members will move past points P or Y, as will pass each loading station, in the same length of time. Assuming, for example, that the capacity of the fruit transfer or treating machine is 120 fruit units per minute, while the loading capacity of one operator is 60 units per minute, it will be seen that two operators, each loading independently of the other at maximum loading speed, may, with my invention, keep the fruit transfer or treating machine operating at a greater capacity than could be attained by one operator.

The flexible sections 4, 4' (and members 1, 1' respectively connected thereto) may be driven by a motor 6. Motor 6 drives coaxial shafts 7, 7' in the same direction and at the same speed through reduction gearing in box 6'. Shaft 7' carries a pair of sprockets 8, 8' over which said sections extend, and which sprockets may be formed with a circumferentially extending groove in its periphery with notches in the edges of the sprockets for engaging members secured on the sections or securing adjacent ends of the sections together, as will later be described.

The shafts 7, 7' have bevel-gears 9, 9' secured on their outer ends, the teeth of which gears mesh with the teeth on bevel-gears 10, 10'. Gears 10, 10' are secured on one of the ends of shafts 11, 11', which latter shafts carry sprockets 12, similar to sprockets 8, 8'. The endless driving means for members 1, 1', that are respectively formed by sections 4, 4', extend over the sprockets 12, respectively. Thus sprockets 8, 8' are at one of the ends of the said driving means and sprockets 12 are at the other ends, and all of the sprockets 8, 8' and 12 are so driven as to move the members 1, 1' or "flights," so that the upper rows of the latter will be moved from sprockets 12 toward sprockets 8, 8', and over the latter back to sprockets 12.

Referring to Figs. 3 to 5, the loading or feed device are supported on any suitable frame, such as 14, with the various shafts in bearings. The arrangement is preferably such that the tracks for the fruit supporting members 1, 1' are generally horizontal at 2, 2' and 3, although they may be inclined to suit any unusual condition.

Tracks 2, 2' are of the same construction, and as track 2' is most clearly shown, this track will be described in detail, it being understood that the members applied to track 2' are the same for similar elements in track 2.

This track comprises a pair of generally horizontally extending, parallel angle strips 15, 16 respectively positioned with one of their legs vertical and with their other legs coplanar and extending toward each other and spaced apart at their free edges to define opposite sides of a slot 17 (Fig. 6). The frame 14 may be secured to said vertical legs.

The upper flat surfaces of legs 15, 16 provide a support for the members 1, 1' and constitute the tracks 2, 2'.

The particular members 1, 1' disclosed in Figs. 1 to 6 are shown as frusto-conical cups open top and bottom, with the smaller ends of the cups adjacent the track supporting the same and which lower ends are directly over slot 17. These cups are shaped to support a pear in each with its stem end down and projecting out of the lower open end of each cup, while the blossom end projects above the upper open end. Thus suitable cutters at any one or more of the points P, Y, on track 3 may be arranged to cut off opposite ends of the pears, or one or more corers may operate axially of the pears to core the same at any one or more of said points.

Each cup or member 1 (or 1') is supported on a flat plate 18 in a position above the latter by end brackets 19 at opposite outer sides of the cup, and which brackets secure each cup to each plate 18.

Below each plate 18 and directly below each cup, is a flat-sided, plate-like element 20 depending from the plate. Element 20 extends through slot 17 to a substantial distance below the latter, and the plane of the element is co-planar with a vertical plane extending longitudinally of the slot and bisecting the latter, with the free edges of legs 15, 16 adjacent opposite sides of said element. Thus the element 20 functions to guide the fruit supporting members for movement longitudinally of slots 17 in tracks 2, 2'.

Referring to Figs. 5, 6 it is seen that each of the elements 20 is connected to the sections 4, 4' by means of blocks 21 that are vertically pivoted at 22 (Fig. 5) between a pair of ears 23 that project laterally from one of the sides of each element 20. A block 21 is secured in any suitable manner to each of the opposite ends of each of the sections 4, 4'. The flexible sections 4, 4' readily pass around the sprockets 8, 8' and 12, and said sprockets are recessed at 24 (Fig. 4) to receive the lower of ears 23, and which engagement between the lower one of each pair of ears 23 and the trailing edge of each recess 24, causes a positive driving of the sections 4, 4' and members 1, 1' that are connected therewith. The vertical pivots 22 permit the sections 4, 4' to pivot at their ends to enable the members 1, 1' to pass around disks 5' to points P, Y on track 3.

At the adjacent ends of tracks 2, 2' a plate 25 that is co-planar with legs 15, connects between the adjacent ends of said legs, and which plate 25 is formed with arcuately extending free edges that are in continuation of the free edges of legs 15. These arcuately extending edges on plate 25 terminate close together at their ends that are outwardly of the ends of legs 15, and said arcuate edges conform in linear contour to the circumferences of the disks 5, with one of said arcuate edges extending and along one edge of each disk.

There are two pairs of disks 5, each pair being supported for rotation on a vertical shaft 26. The upper disks of each pair are co-planar with the plate 25 and legs 15 and are respectively positioned so that their outer, circular edges are uniformly spaced from the free, adjacent, curved edges of the plate 25 during rotation of the disks. This space between the edges of the disk and curved edges of the plate 25, forms arcuate slots 27 in continuation of slots 17 (Fig. 3), and which slots merge together to one slot that is defined by the adjacent edges of disks 5. This point of mergence is the point P in Fig. 1.

The track 3, is substantially identical in structure to tracks 2, 2', and the horizontal upper strips forming the track 3, define a single slot 28 in continuation of the adjacent ends of slots 27. Slot 28 is identical with slots 17 in either of tracks 2, 2'.

It is pertinent to note that the ears 23 support sections 4, 4' offset from the sides of the elements 20 that face oppositely outwardly when the elements 20 are moved into slot 28 in track 3. By staggering the positions of cups 1 along sections 4 relative to cups 1' along sections 4', it will be seen that simultaneous movement of the sprockets 8, 8' will cause the cups 1, 1' to alternately enter slot 28, as best indicated in Figs. 1 and 3.

Referring back to the pairs of disks 5, the upper disk of each pair is co-planar with plate 25, hence as the elements 2 pass into slots 27 the edges of said upper disks 5 will engage the sides of the elements that carry ears 23, just below plates 18, and above the upper ear of each pair of ears 23. The lower disk of each pair of disks 5, engages the same side of each element 20 as is engaged by the upper disks 5, but below the lower one of ears 23. Thus the cups and elements 20 connected thereto, are supported in their vertical positions as the cups make the turns in slots 27 to enter slot 28, and the vertical pivots between blocks 21 and the sections connected thereto permit the sections, when drawn taut to extend straight between adjacent cups while the latter are making the turn around the edges of the disks (Fig. 3).

Insofar as the general operation of the feed or loading device is concerned, as so far described, both forms of the invention herein are substantially the same, in that the fruit supporting members are moved from separate paths of travel into alternate positions in a single row for movement longitudinally of said single row in a single path of travel, or for alternate movement to point P (Fig. 1), and there is no stopping of the cups at any point in the single path of travel that is common to the cups or members. The principal difference between the two forms of the invention, is that in the device of Figs. 1 to 5, I provide means at the loading stations, or along tracks 2, 2' for providing slower movement of the cups past the loading station, and also for bringing a plurality of the cups or members 1, 1' close together at or adjacent said stations, to facilitate the loading of the fruit or vegetable units at said stations.

The slowing down of the members 1, 1' at the loading stations is accomplished by means of a brake device adjacent each of said stations and between said stations and the point P together with a separate drive means for the cups at said station.

These brake devices are generally designated 29, and each device comprises a brake shoe 30 that is carried at one end of an arm 31, which arm is horizontally pivoted at 32 at its end opposite the shoe to a bracket 33 secured to the depending leg of strip 15 (Fig. 6). The shoe 30 is elongated longitudinally of strip 15 and overlies said strip at a point in the path of travel of the margins of plates 18 that slide on strip 15. The end of the shoe 30 facing toward the oncoming plates is turned up or beveled, so that the said margins of plates 18 will automatically raise the plates to permit them to slide between the shoe and said margins, and a coil spring 34 reacting between a nut 35 and the upper side of said arm yieldably forces the shoe downwardly against the margins of plates 18 that pass therebelow, with a force that is regulated according to the tension applied against the spring by turning the nut on bolt 36 that carries said nut. The bolt 36 is secured to bracket 33 at its lower end, and a pair of lock nuts 37 may be threadedly held on said bolt below the slot in arm 31 through which said bolt extends, to function as a stop for spacing the shoe 30 from strip 15, a distance slightly less than the thickness of plates 18, thus facilitating the passage of the margins of said plates to between the shoe 30 and strip 15, but still furnishing the desired friction against said margins.

The sections 4 and the sections 4', respectively connected to form each of the endless conveyers, are relatively taut between the brake devices and sprockets 12 in a direction extending from the brake devices in the direction of travel of the sections, but said sections are sufficiently slack for the remaining portion to permit the adjacent fruit supporting members to move relatively toward each other as best seen in Fig. 4 so as to reduce the spacing between said adjacent members at said remaining portion.

An outer housing or hood 38 encloses each of the sprockets 12, and cups, as they are brought around the sprocket and onto tracks 2 or 2'.

The spacing between adjacent fruit supporting members 1, or between adjacent members 1', is substantially double the outside dimension of each cup including its brackets and supporting plate 18 in direction longitudinally of the slot in which the elements 20 are adapted to slide, thus, when the members 1, 1' alternately pass into slot 28, they will be only half as far apart as before passing into said slot, or in other words, double the number of fruit supporting members will pass point P or points Y, in the same time that half the number of such members pass each loading station X. This means that a single fruit treating machine or the like operating on the fruit or vegetable units at point P or at any of points Y, or a transfer mechanism for the fruit or vegetable units from the members 1, 1' at any of said points will have double the capacity of such machine were it receiving or transferring fruit units loaded on a single device by only one operator.

The tracks 2, 2' and 3, continue around sprockets 12 and 8, 8' respectively to guide the elements 20 and cups attached thereto upon the return of the cups to the loading station, and lower pairs of disks 5' on each of shafts 26, as well as a lower plate corresponding to plate 25, but co-planar with the lower one of the pairs of disks 5', to guide the cups and elements 20 in passing around the disks 5' on their return to the loading stations. The pairs of disks 5 and 5', are, of course, freely rotatable on shafts 26 so as to rotate in directions generally corresponding to the directions of travel of the upper and lower runs of endless chains 4, 4'.

The drive device for the members 1, 1' at each of the loading stations, comprises a train of gears 39, 40, 41 at each loading station (Fig. 4). The arrangement of these gears at each station is the same, hence will be described in detail relative to the station that is adjacent sprocket 12 on shaft 11', which is shown best in Fig. 4.

Gear 39 is secured on shaft 11' adjacent the side of said sprocket that is adjacent bevel gear 10', and this gear meshes with gear 40 that is rotatable on a stub shaft 40'. The gear 40 in turn meshes with a gear 41 that is adjacent a sprocket 42, and which sprocket and gear 40 are mounted for rotation together as a unit on stub shaft 43. The ratio between gears 39 to 40 and sprocket 42 is such that said sprocket is revolved at half the speed of sprocket 12 on shaft 11', and each of the plates 18 is formed with a row of openings 44 along the margin thereof longitudinally of the plate, which openings are spaced to be successively engaged by the teeth of sprocket 42 as the latter is revolved in the same direction as sprocket 12. This row of teeth and sprocket 42 are laterally outward of the outer ends of ears 23 so as not to interfere with said ears.

In operation of the device shown in Figs. 1 to 5, upon starting motor 6, the sprockets 8, 8' and 12 will commence driving sections 4, 4' to move members 1, 1' from the brake devices 29 around disks 5 to point P, where said members will alternately arrive and will continue to move in alternate relation along track 3, and over sprockets 8, 8' and back around disks 5' to sprockets 12 and upwardly around said sprockets to the upper sides of the latter. Treatment of the fruit, or transfer thereof, may occur at any one of points P, Y. In any event, the fruit units will be removed from members 1, 1' before said members arrive back at the loading stations.

Immediately upon the lower of ears 23 connected with each element 1' (or 1') being disengaged from sprocket 12, the teeth and sprocket 42 at each loading station will commence to drive the member 1 (or 1') toward the brake device, and will push one or more of such members ahead of it toward said brake device at one-half the speed at which the members are driven from said brake device to the point where each member is disengaged from sprocket 12. Thus the section between the member that is just disengaged from sprocket 12 and the one following it, will slacken, as shown in Fig. 4 and the cups or members 1, 1' will move slowly past each loading station. This action is most desirable since the capacity of the feeding device is not lessened by reason of this slowing down of the cups or members 1, 1', and each operator at X is given an appreciably greater time to properly load the fruit on the members 1, 1'.

*Figs. 7 to 9*

The principal difference between Figs. 7 to 9 and Figs. 1 to 6, is that in Figs. 7 to 9, there is no slowing down of the fruit supporting members at the loading stations, and instead of using flexible sections of cable, wire, etc. the connections between the adjacent members 1, 1' are chains 45 that are adapted to pass over sprockets corresponding to sprockets 8, 8' and 12, except that teeth are formed in the sprockets to mesh with the chains.

The slowing down mechanism of Figs. 1 to 6, including the brake devices, is eliminated from the device of Figs. 7 to 9, and the sprockets 46, which correspond to sprockets 8, 8', are the only ones driven by the motor, thus eliminating the bevel-gears 9, 9', 10, 10', and shafts 7, 11, 11', from the device of Figs. 7 to 9.

In the device shown in Figs. 7 to 9, the tracks 2, 2' are each carried on the outer end of an arm or bracket 47, and the inner end of each arm 47 is supported on one of shafts 26 for swinging of each arm about the axis of each shaft. Also the chains, members 1, 1' and sprockets at the outer ends of tracks 2, 2' are carried by the tracks for swinging therewith, by means of any suitable framework or connections. Thus, upon removal of the plate 25 that connects between the adjacent ends of tracks 2, 2', the said tracks, sprockets, chains and members 1, 1' may be swung about the axes of said shafts 26 to any desired angular positions relative to each other, one of which positions for track 2' is indicated in dotted line at 47'. A plate corresponding in general to plate 25, but cut to fit against the adjacent ends of the tracks when in adjusted position, is then bolted in position between the adjacent ends of the tracks to form combinations of the strips 15, and slots 27 to point P which is between the adjacent edges of disks 5.

In operation, the device of Figs. 7 to 9 varies from that of Figs. 1 to 6, only in that there is no stopping or slowing down of the separate flights or members 1, 1' during their movement.

While both forms of the invention, herein shown, disclose a pair of separate conveyers arranged to be separately loaded at separate loading stations, it is manifest to anyone skilled in the art that the number of such separate conveyers, all of which carry their loads to a single point, or to a single path of travel on tracks 3, may be increased by increasing the spacing between the adjacent fruit supporting members on each conveyer by an amount equal to the length of each such member for each extra conveyer added, and by offsetting the drive chains or sections laterally relative to each other sufficient distances to clear each other where the fruit supporting members are carried along track 3. Thus the full treating capacity of any particular type of machine used at any of the points P or Y may be utilized whether such capacity equal to the combined loading capacities of two, three, or more operators, as the case may be.

Fig. 10 diagrammatically illustrates an arrangement where four separate conveyers carry the fruit holders to a single point P and along a single track 3 for transfer or treatment of the fruit units.

In this arrangement the four sprockets 12 are adjacent the loading stations, and a brake device 29, as already described, for the form of device illustrated in Figs. 3 to 6 is disposed along each of the separate paths of travel of the fruit holders prior to their arrival at point P. The sprockets 12 are connected to drive the holders toward point P, while the four sprockets 50 on shaft 7' draw the holders from the brake devices to point P. The sections 51, 52 correspond to sections 4, 4', except they are laterally offset from the elements on the fruit supporting members a sufficient distance to be outwardly of sections 53, 54 when the fruit supporting members are on track 3. These sections 53, 54, connect between the flights or fruit supporting members on the extra pair of tracks 55, 56. The tracks supporting the members connected by sections 51, 52 are designated 2, 2' since they correspond to the tracks 2, 2' in Figs. 1 to 6.

At the loading stations the fruit supporting members on each track are driven by means separate from the sprockets 12, or 50, by means already described, but the cups are so driven at one-fourth the speed of sprockets 50, but at a speed that enables each operator to load fruit onto the holders at his or her maximum capacity. The fruit treating machine or transfer means that operates on the fruit on track 3 may thus be operated at an extremely high rate of speed or at least four times as fast as would be the case were only one operator loading the fruit on a single conveyer.

While I have stated that the flexible sections 4 and 4' may be of wire, cable, or chain, it is obvious that flexible sections of any suitable construction for functioning in a manner equivalent to the chain or wire, as disclosed may be used. Also, disks 5 may be stationary to form arcuately extending guides adjacent the point P, although the disks reduce the frictional resistance of moving the supporting members to point P.

The description of my device and method as being for the feeding of fruit or vegetables to a treating or transfer point, is not intended as a restriction in the device or method, inasmuch as the idea generally may be employed for feeding or conveying any desired objects to a treating or transfer point.

Having described my invention, I claim:

1. In apparatus of the character described in which there is a pair of chain conveyers each carrying a plurality of spaced fruit supporting members in a row parallel therewith for movement of the said members therewith longitudinally of the conveyers; each of said conveyers being supported for movement thereof around spaced horizontal axes thereby providing an upper and a lower run; the upper runs of said conveyers extending convergently relative to a single point intermediate their ends and then parallel in direction away from such point; guide means positioned adjacent the said parallel runs of said conveyers supporting said members along said parallel runs for movement in single file upon actuation of said conveyers for movement of the convergent runs thereof toward said single point and for movement of the parallel runs in the same direction away from said point; and means for so actuating said conveyers.

2. Apparatus of the character described comprising; a plurality of elongated, endless conveyers each provided with spaced members respectively formed to carry thereon and stationary relative thereto a single fruit or vegetable unit for movement with said conveyers longitudinally thereof; said conveyers having portions parallel with each other, the remainder of each conveyer extending angularly away from said parallel portions; the members on said conveyers along said portions being disposed in a single row to traverse a common path, and the members on the said remainders of said conveyers being in separate rows; means actuating said conveyers for movement of the members thereon in the same direction along said common path; the said members at a point along each of the said remainders of said conveyers being exposed for loading a single fruit or vegetable unit thereon for movement therewith to said common path, a part of the length of each conveyer being slack at each of said points and means adjacent each of said points arranged and adapted to delay the time of passage of said members through a substantial distance in their movement that includes said point to a time less than the time of passage of said supports through any other equivalent distance along said conveyers.

3. Apparatus of the character described comprising; a plurality of separate, endless, flexible conveyers each having fruit or vegetable supporting members secured thereto for movement therewith and uniformly spaced along each conveyer; means supporting portions of the lengths of said conveyers extending convergently toward a single point, sprocket-like members at opposite ends of said conveyers mounting the latter for movement thereof from the divergent ends of said portions toward said point; guide means for supporting the said members for movement along straight lines from the divergent ends of said portions and said point upon actuating said sprocket-like members for causing said movement of said conveyers; means for actuating said sprocket-like elements for so moving said conveyers; brake devices along each of said conveyers positioned at a point between the convergent and divergent ends of the said portions thereof slidably engaging a part of each of said members for resisting said movement of said members toward said point, and said conveyers being slack between the divergent ends of the said portions and the said brake devices whereby the speed of travel of the members from said divergent ends to said brake devices will be less than the speed of travel of said members from the said brake devices to the convergent ends of said portions.

4. Apparatus of the character described, comprising: a plurality of converging guide tracks; a plurality of similarly formed fruit holders movable along each of said guide tracks; a single track disposed in continuation of said converging ends for receiving thereon holders from said guide tracks; an endless chain adjacent each of said guide tracks and parallel therewith, and extending from said converging ends parallel with said single track and adjacent thereto; means connecting said chains with said holders securing the latter to said chains in spaced relation for movement of said holders with said chains; and means for actuating said chains for moving said holders along said guide tracks onto said single track and along the latter; said single track being adapted to support the holders moved therealong for movement along a common path of travel and each of said holders being adapted to support a unit of fruit thereon for movement therewith, each of said converging tracks being substantially straight along a portion of its length to facilitate loading of the holders moving therealong.

5. Apparatus of the character described comprising: a pair of generally horizontally extending endless chains; vertically positioned sprockets at opposite ends of said chains supporting each of said chains with one elongated run thereof above the other and for movement of said chains about horizontal axes at their said opposite ends; the sprockets at one of said ends being coaxial and relatively close together and the sprockets at the opposite ends of the chains being relatively widely spaced apart; the upper runs of said chains extending from said coaxial sprockets toward the widely spaced sprockets being parallel for a predetermined distance and then extending divergently to said widely spaced sprockets; means holding said upper runs in said parallel and divergent relationships during movement of said chains about the axes of said sprockets; a plurality of fruit holders offset to the sides of said chains that are adjacent each other when said upper runs are parallel; means securing said holders to said chains in said offset positions; the degree of offset of the holders on each of said chains being a distance to position said holders in a single row along the parallel portions of said upper runs for movement along a common path of travel; means for actuating said sprockets to cause movement of the upper runs of said chains in direction from said widely spaced sprockets to said coaxial sprockets whereby said holders will be moved along divergent paths from said widely spaced sprockets to said common path, and the holders on one of said chains being positioned relative to the holders on the other chain for alternate arrival at said common path from said divergent paths.

6. A conveying mechanism for carrying whole peaches, pears, or the like comprising a first conveyer and a second conveyer each provided with a series of fruit holders of the same shape and size, guide members supporting said conveyers and said holders for movement of the latter along convergent paths to aligned position in a single path and along said single path upon simultaneous actuation of said conveyers in one direction, means for so actuating said conveyers, and each of said holders being formed to support a whole fruit thereon in a predetermined fixed position relative thereto during movement thereof with a substantial portion of each such fruit exposed above each support, the said paths including said single path being relatively arranged to define a generally Y shape in which the leg of such Y shape defines the single path with the head defining the convergent paths thereby providing separate loading zones along said convergent paths for loading the holders of each conveyer with fruit.

PERCY JEPSON.